United States Patent
Smidth

(10) Patent No.: US 8,428,186 B1
(45) Date of Patent: Apr. 23, 2013

(54) DECISION DIRECTED DC OFFSET REMOVAL

(75) Inventor: Peter Smidth, San Luis Obispo (DK)

(73) Assignee: Exalt Communications Incorporated, Campbell, CA (US)

( * ) Notice: Subject to any disclaimer, the term of this patent is extended or adjusted under 35 U.S.C. 154(b) by 546 days.

(21) Appl. No.: 12/345,630

(22) Filed: Dec. 29, 2008

Related U.S. Application Data

(60) Provisional application No. 61/017,128, filed on Dec. 27, 2007, provisional application No. 61/017,129, filed on Dec. 27, 2007, provisional application No. 61/017,130, filed on Dec. 27, 2007, provisional application No. 61/017,132, filed on Dec. 27, 2007.

(51) Int. Cl.
*H04L 25/06* (2006.01)

(52) U.S. Cl.
USPC .......................................... 375/316; 375/319

(58) Field of Classification Search ................... 375/144, 375/227, 231, 236, 240.27, 254, 278, 287, 375/317
See application file for complete search history.

(56) References Cited

U.S. PATENT DOCUMENTS

| | | | |
|---|---|---|---|
| 4,764,921 A | | 8/1988 | Graves et al. |
| 4,873,702 A | * | 10/1989 | Chiu ............................. 375/319 |
| 5,241,702 A | * | 8/1993 | Dent .......................... 455/278.1 |
| 5,442,655 A | * | 8/1995 | Dedic et al. .................... 375/340 |
| 5,805,632 A | * | 9/1998 | Leger ............................. 375/282 |
| 6,560,237 B1 | | 5/2003 | Hiscock et al. |
| 6,671,112 B2 | * | 12/2003 | Murakami et al. .............. 360/39 |
| 7,600,040 B1 | | 10/2009 | Henry et al. |
| 2003/0112817 A1 | | 6/2003 | Woo et al. |
| 2004/0076161 A1 | | 4/2004 | Lavian et al. |
| 2004/0100963 A1 | | 5/2004 | Guo |
| 2004/0131028 A1 | | 7/2004 | Schiff et al. |
| 2005/0131984 A1 | | 6/2005 | Hofmann et al. |
| 2006/0236376 A1 | | 10/2006 | Liu et al. |
| 2008/0117855 A1 | | 5/2008 | Choi et al. |
| 2010/0040347 A1 | | 2/2010 | Kent et al. |
| 2010/0046554 A1 | | 2/2010 | Wilkinson |

OTHER PUBLICATIONS

U.S. Appl. No. 12/345,290, filed Dec. 29, 2008, Office Action, mailing date Jul. 6, 2011.

* cited by examiner

*Primary Examiner* — David C. Payne
*Assistant Examiner* — Wednel Cadeau
(74) *Attorney, Agent, or Firm* — Hickman Palermo Truong Becker Bingham Wong LLP

(57) ABSTRACT

A method and apparatus for decoding a baseband signal of a radio signal removes, from the baseband signal, low-frequency and long-term noise that increases the possibility of decoding errors. The removal of low-frequency and long-term noise is performed by accumulating differences between the actual signal levels of the baseband signal and the expected signal levels for the baseband signal and subtracting the accumulated difference from the baseband signal before decoding. In one scheme, the baseband signal contains a predetermined training sequence of signal levels, where the differences between the actual signal levels of the baseband signal and the expected signal levels for the predetermined training sequence are accumulated. At the end of the training sequence, the accumulated training sequence difference is used as the accumulated difference and subtracted from the baseband signal, thereby providing stable operation for decoding signal levels that follow the training sequence.

18 Claims, 3 Drawing Sheets

DECISION DIRECTED DC OFFSET REMOVAL

This application claims benefit under 35 U.S.C. §119(e) of Provisional Appln. 61/017,128, titled "Method for Automatic Timing Synchronization for Wireless Radio Networks", filed Dec. 27, 2007, Provisional Appln. 61/017,129, titled "Adaptive Multi Service Data Framing", filed Dec. 27, 2007, Provisional Appln. 61/017,130, titled "Decision Directed DC Removal Scheme", filed Dec. 27, 2007, and Provisional Appln. 61/017,132, titled "Means and Apparatus for Mitigation of Thermal Power Slump in Radio Devices by Using a Surrogate Carrier", filed Dec. 27, 2007, the entire contents of which are hereby incorporated by reference as if fully set forth herein.

FIELD OF THE INVENTION

The present invention relates to radio communications. More specifically, the present invention relates to techniques for removing DC and low frequency noise from radio signals.

BACKGROUND

In radio communications, demodulators in radio receivers convert signals received at radio frequencies into baseband signals and decode the baseband signals to recover the original data. FIG. 1 illustrates a demodulator 100 that demodulates and decodes received radio signal 102.

In FIG. 1, demodulator 100 receives radio signal 102, which is a modulated signal that conveys original data at a radio frequency, or carrier frequency. Radio signal 102 may be analog or digital. If radio signal 102 is analog, it is converted to digital by an analog-to-digital converter (ADC), which is not specifically shown. Radio signal 102 may be a complex-valued signal. In demodulator 100, radio signal 102 is a complex-valued signal and is applied to two parallel multipliers 124 and 126. In multiplier 124, radio signal 102 is multiplied with a function $\cos(\omega t)$, where $\omega$ is $2\pi$ times the carrier frequency. In multiplier 126, radio signal 102 is multiplied with a function $\sin(\omega t)$, where $\omega$ is $2\pi$ times the carrier frequency. Outputs 104 and 106 are applied to low-pass filters 116 and 118, respectively, which provide anti-aliasing and remove out-of-band noise. The outputs 108 and 110 of low-pass filters 116 and 118 are the real and imaginary components, respectively, of a complex baseband signal derived from the received radio signal 102.

The outputs 108 and 110 are then each applied to decoders 120 and 122, respectively, to produce decoded signals 112 and 114, respectively. Decoders 120 and 122 receive outputs 108 and 110 and output decoded signals 112 and 114, respectively, based on the signal levels in outputs 108 and 110. Since decoders 120 and 122 perform the same functions, the discussion from this point forward will focus on a single decoder (e.g., decoder 120). Techniques discussed with respect to decoder 120 are, however, equally applicable to decoder 122.

Decoder 120 samples output 108 and generates, based on the signal level of output 108, a decoded signal 112 whose signal level comprises particular values. In an example, output 108 is a bi-level signal whose signal level is expected to be either +0.5 or −0.5 in any particular sample period. The signal level of output 108 may be expected to be either +0.5 or −0.5 in any particular sample period because it may be known that radio signal 102 is a radio signal that is based on an original baseband signal that was encoded to be either +0.5 or −0.5 in any particular sample period. In this example, decoder 120 compares the signal level of output 108 during a particular sample period to a decision value, which is 0 in this case because 0 is halfway between the encoded values of +0.5 or −0.5. If the signal level of output 108 is greater than 0 during a particular sample period, then decoder 120 will output a decoded signal 112 whose signal level is a first value. If the signal level of output 108 is less than 0 during a particular sample period, then decoder 120 will output a decoded signal 112 whose signal is a second value. The first value and second value may be +0.5 and −0.5, or any other two distinct values.

However, output 108 may also include DC offset noise, which is a low-frequency, slow-changing noise that results in output 108 exhibiting a DC offset. Waveform 202 in FIG. 2 represents a signal that is unaffected by any low-frequency, slow-changing noise and has a signal level of +0.5 or −0.5 in any particular sample period. Waveform 204 represents a low-frequency and slow-changing noise. When the noise represented by waveform 204 is added to the signal represented by waveform 202, the resultant signal, represented by waveform 206, exhibits a downward slope such that a signal level that is positive in the original signal represented by waveform 202, in a particular sample period, may be negative in that same sample period. Consequently, when the signal represented by waveform 206 is input into a decoder such as decoder 120, a decoding error will result in the particular sample period.

Various methods have been developed to remove this DC offset noise from signals so as to reduce or eliminate decoding errors. These methods include employing a low-frequency high-pass filter to remove the low-frequency components from the signals. However, these methods suffer from slow tracking bandwidth. Alternatively, a wide-band high-frequency filter may be used, but this can cause inter symbol interference. Therefore, there is a need for a method for removing DC offset noise from a signal that allows for fast tracking without decreasing the signal-to-noise ratio of the signal.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A system and techniques are described for decoding a baseband signal, of a radio signal, that is expected to include certain signal levels. One such system includes a comparator that compares a corrected baseband signal to certain decision values. The comparator outputs, based on the comparison, a decoded signal that is equal to one of the expected signal levels. The difference between the corrected baseband signal and the output of the comparator is accumulated and then subtracted from the baseband signal to produce the corrected baseband signal. The subtraction of the accumulated difference from the baseband signal completes a negative-feedback loop that removes any long-term, low-frequency DC offset exhibited by the baseband signal. The loop produces the corrected baseband signal, which is used as a basis for comparison in determining the output decoded signal, thereby reducing decoding errors caused by the addition of long-term, low-frequency DC noise to radio signals.

According to one technique, the baseband signal is a multi-level signal that is expected to include more than two distinct signal levels.

According to one technique, the baseband signal is a bursty signal that contains a training sequence that precedes a burst of data.

Decision Directed DC Removal

Figure 1:
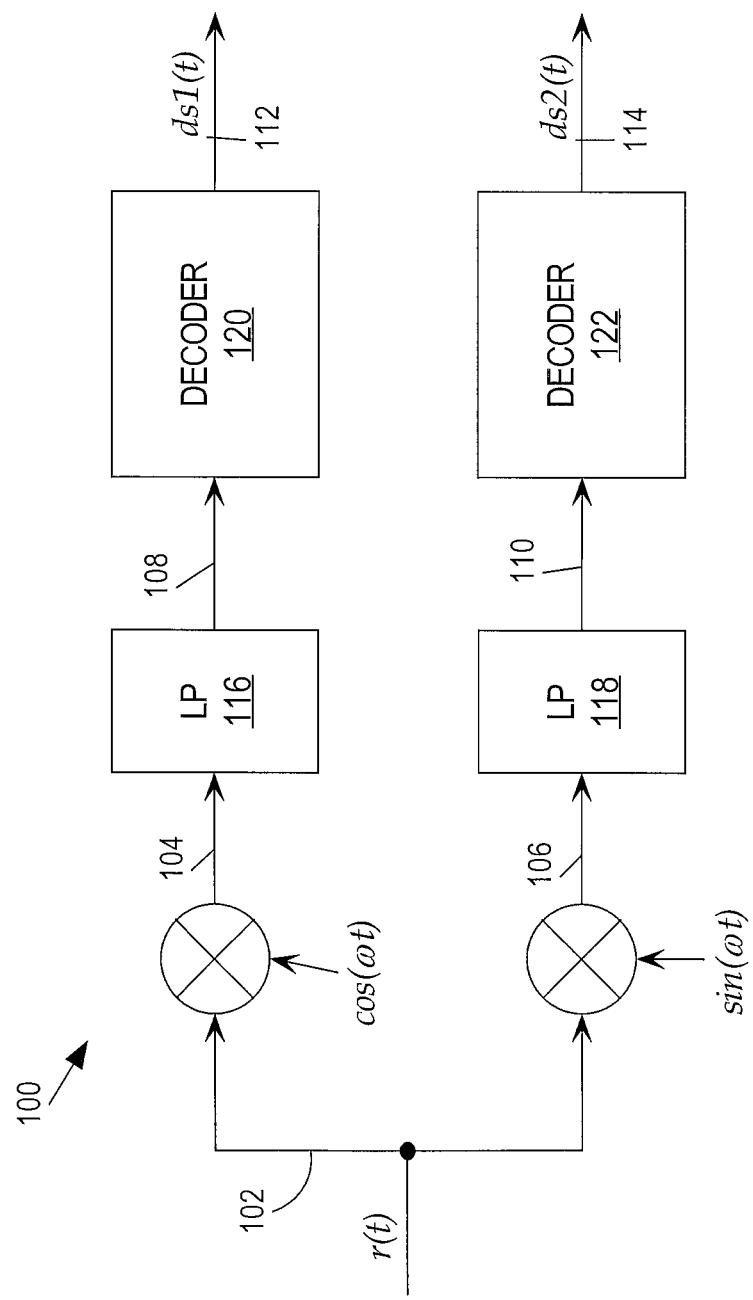
FIG. 1 is a block diagram that illustrates a system for demodulating and decoding a radio signal.
Figure 2:
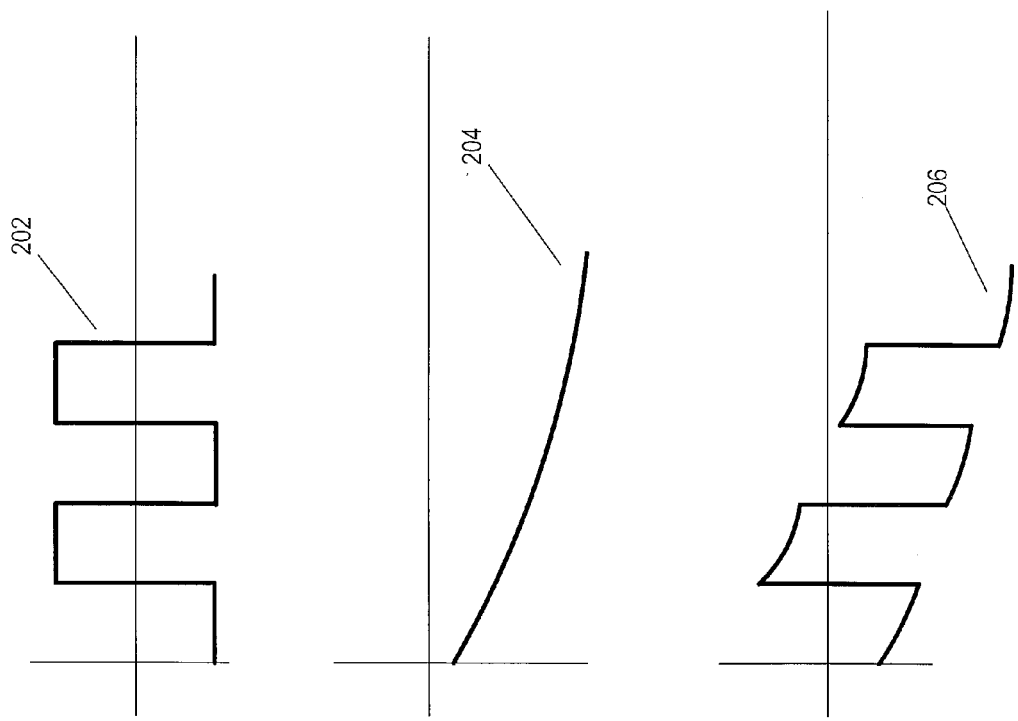
FIG. 2 illustrates waveforms of example signals, DC noise, and signals affected by DC noise.
Figure 3:
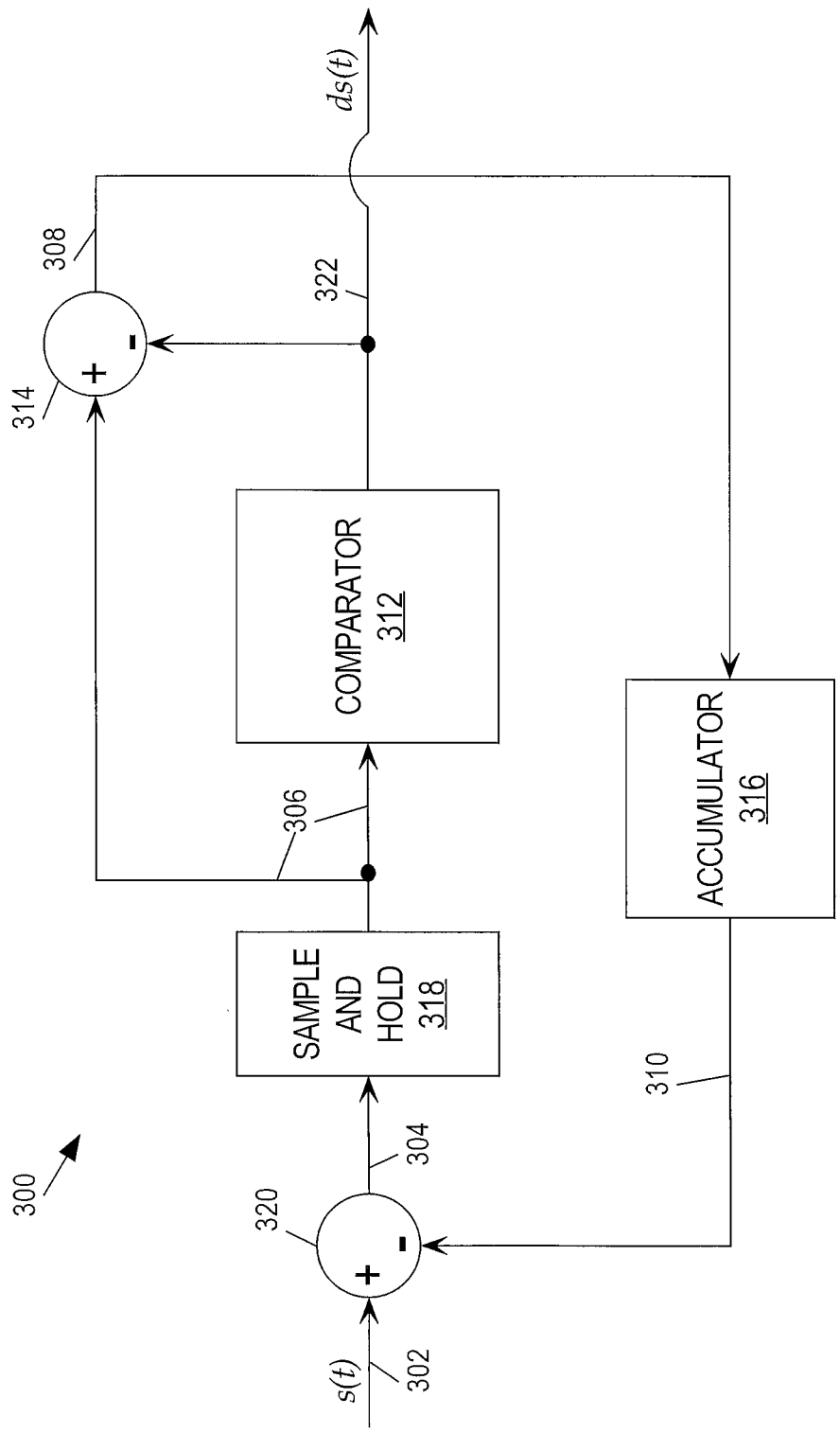
FIG. 3 is a block diagram that illustrates a system for decoding a baseband signal.

A decoding system 300 in which the present invention may be practiced is illustrated in FIG. 3. A received signal s(t) 302 is an input to decoding system 300. Received signal 302 may be a baseband signal, such as signal 108 or signal 110 in FIG. 1. A subtractor 320 subtracts accumulated value 310 from received signal 300, producing corrected signal 304. In decoding system 300, corrected signal 304 is sampled and held by sample-and-hold module 318. In other embodiments, it may not be necessary for corrected signal 304 to pass through a sample-and-hold module 318. In other words, corrected signal 304 may be directly inputted to comparator 312. In decoding system 300, sampled corrected signal 306 is inputted to comparator 312, which determines an output value 322 based on sampled corrected signal 306.

Comparator 312 compares the signal value of sampled corrected signal 306 in a particular sample period to at least one decision value and, based on the result of the comparison, selects one of at least two distinct values as output value 322 for the duration substantially equal to the length of the particular sample period. The at least two distinct values are equal to the expected signal values of received signal s(t) 302 if received signal 302 is unaffected by noise. The signal level of received signal s(t) 302 may be expected to be certain expected signal values because it may be known that received signal s(t) 302 is based on a radio signal that is in turn based on an original baseband signal that was encoded to be certain expected signal values.

For example, the received signal s(t) 302 may be a signal whose signal value for any particular sample period is expected to be either +0.5 or −0.5 because it is known that received signal s(t) 302 is based on a radio signal that is in turn based on an original baseband signal that was encoded to be either +0.5 or −0.5 in any particular sample period. In this example, comparator 312 uses the decision value of 0 such that if comparator 312 determines that the sampled corrected signal 306 is greater than 0 in the particular sample period, then comparator 312 outputs the value +0.5 as output value 322. Similarly, if comparator 312 determines that the sampled corrected signal 306 is less than 0 in the particular sample period, then the comparator 312 outputs the value −0.5 as output value 322. In this example, even if the signal level of sampled corrected signal 306 is only +0.3 for a particular sample period, comparator 312 will output a value of +0.5 in response to comparing the signal level of sampled corrected signal 306 to the decision value of 0.

In other words, although received signal s(t) 302 may have been affected by noise such that the signal level of received signal 302 deviates from the expected signal levels, comparator 312 outputs a value (output value 322) that is equal to an expected signal level.

Subtractor 214 subtracts output value 322 from sampled corrected signal 306 and outputs error value 308. Error value 308 is the difference between the sampled corrected signal 306 and output value 322, which, as just discussed, is equal to an expected signal level. For example, if sampled corrected signal 306 is +0.7 and output value 322 is +0.5, then error value 308 will be +0.2. In this example, error value 308 may indicate that the overall signal level of sampled corrected signal 306 is exhibiting a positive DC offset of +0.2, which in turn may indicate that received signal s(t) 302 is exhibiting a positive DC offset of +0.2.

Error value 308 is accumulated, or summed, in accumulator 316. The sum accumulated in accumulator 316 indicates the long-term DC offset exhibited by received signal 302. In one embodiment, the accumulation of error value 308 in accumulator 306 is performed by an integrator. The accumulated error value, output as signal 310, is subtracted from received signal 302 s(t) in subtractor 320 to produce corrected signal 304. The subtraction of the accumulated error value 310 from received signal 302 removes the long-term DC offset indicated by the accumulated error 310 from received signal 302, thereby producing a corrected signal 304 that contains signal levels that are closer to the expected signal levels.

Corrected signal 304 is sampled and held to produce sampled corrected signal 306, which is then used by comparator 312 to produce output 322, thereby completing a negative-feedback loop. As the negative-feedback loop in decoding system 300 stabilizes, error value 308 and accumulated error value 310 will likely be zero or small non-zero values.

According to one embodiment, received signal s(t) 302 represents a multi-level signal such that output value 322 is selected by comparator 312 from more than two distinct values, based on the corrected signal 306. In other words, the original baseband signal from which received signal 302 is based may have been encoded to be one of more than two signal levels for any particular sample period. For example, the original baseband signal may have been encoded to be −0.75, −0.25, +0.25, or +0.75 in any particular sample period.

In this example, comparator 312 compares corrected signal 306 to three decision values: −0.5, 0, and +0.5 and, based on the result of the comparison, selects one of four distinct values as the output value 322. If corrected signal 206 is less than −0.5, then the comparator outputs −0.75 as output value 322. If corrected signal 206 is between −0.5 and 0, then the comparator outputs −0.25 as output value 322. Similarly, comparator outputs +0.25 as output value 322 if corrected signal 306 is between 0 and +0.5, and outputs +0.75 as output value 322 if corrected signal 306 is greater than +0.5. This example illustrates that the invention is not limited to the decoding of bi-level signals, and does not in any way restrict the invention to the specific decision values and output values in the example.

According to another embodiment, other methods of reducing DC offset noise is applied to received signal s(t) 302 before received signal 302 is processed by decoding system 300. For example, signal 302 may be passed through a high-pass filter before being processed by system 300. A high pass filter with a low cutoff may center the operation of system 300 around zero, thereby making implementation simpler.

In another embodiment, range limiting may be applied to prevent decoding system 300 from entering a false lock state. Range limiting may be implemented in accumulator 316 to limit the output value to a predetermined tracking range. Such range limiting may prevent false lock states since accumulated error value 310 will be less than the minimum decision distance.

In one embodiment, system 300 may be controlled by a gain constant that controls the loop gain and therefore the effective bandwidth of the loop in system 300. This may be included within accumulator 316, or can be achieved by placing a gain constant (not depicted) between accumulator 316 and subtractor 320. The gain constant may be a multiplier or a shift function.

Using a Training Sequence in Decoding Bursty Signals

Sometimes, received signal s(t) 302 may be bursty in that received signal 302 contains data only in certain burst periods. A bursty received signal 302 does not contain any data in time periods between the burst periods. One problem encountered in decoding a bursty received signal 302 is that the DC offset exhibited by received signal 302 at the end of a first burst period may be different from the DC offset exhibited by received signal 302 at the beginning of a second burst period that immediately follows the first burst period. Such a sudden jump in DC offset may result in decoding system 300 taking a long time to re-stabilize and making decoding errors during the time of re-stabilization. According to one embodiment, received signal 302 contains a training sequence at the beginning of a burst period, thereby allowing decoding system 300 to stabilize before non-training sequence data is decoded.

The training sequence is a predetermined data sequence that is known to decoding system 300. For example, the training sequence may be a string of zeros. A training sequence comparator (not depicted) in decoding system 300 compares the training sequence in received signal 302 to the predetermined data sequence (e.g., 0, 0, 0, . . . ) and determines the difference between the training sequence in received signal 302 and the predetermined data sequence. This difference between the training sequence in received signal 302 and the predetermined data sequence is accumulated as an accumulated training sequence error value in a training sequence error accumulator (not depicted). The accumulated training sequence error value is loaded into accumulator 316 at the end of the training sequence. As a result, at the end of the training sequence and the beginning of data in a burst period, accumulator 316 will output an accumulated error value 310 that has already been adjusted to the DC offset exhibited by received signal 302. Consequently, decoding system 300 can quickly stabilize, thereby minimizing or eliminating any decoding errors that may have resulted from the differences in DC offsets exhibited by received signal 302 in two consecutive burst periods.

In one embodiment, the training sequence is also known to occur at certain times. In an alternative embodiment, the time at which the training sequence occurs is not known beforehand. Decoding system 300 includes an additional training sequence detector (not depicted) that detects the beginning and end of the training sequence.

In one embodiment, the training sequence contains the highest expected signal level and the lowest expected signal level of received signal 302, which facilitates the fast stabilization of decoding system 300. For example, if the expected signal levels of received signal 302 are −0.75, −0.25, +0.25, and +0.75, then the training sequence contains only the signal levels of −0.75 and +0.75.

In one embodiment, the training sequence has an average signal value of zero, which reduces gain error sensitivity.

In one embodiment, the training sequence detector may be shared by the decoder for the real component of a complex baseband signal and the decoder for the imaginary component of the complex baseband signal.

What is claimed is:

1. A method comprising:
associating each of a plurality of expected values with a value range;
determining that a corrected signal falls within the value range of a particular expected value of the plurality of expected values;
deriving an error value by subtracting the particular expected value from the corrected signal; and
adding the error value to an accumulated error value;
limiting the accumulated error value to a particular range that is based on a minimum distance between the plurality of expected values;
wherein the corrected signal is derived by subtracting the accumulated error value from a received signal; and
wherein the received signal is derived from a radio signal.

2. The method of claim 1, wherein the received signal is a baseband signal of the radio signal.

3. The method of claim 1, wherein:
the received signal is an output of a high-pass filter; and
an input of the high-pass filter is a baseband signal of the radio signal.

4. The method of claim 1, further comprising:
determining whether a signal level of the received signal corresponds to a signal level in a training sequence;
wherein the training sequence is a predetermined sequence of signal levels.

5. The method of claim 4, further comprising:
in response to determining that a signal level of the received signal corresponds to a signal level in the training sequence, performing the steps of:
deriving a training sequence error value by subtracting the signal level of the received signal from a corresponding signal level in the training sequence; and
adding the training sequence error value to an accumulated training sequence error value;
in response to determining that a signal level of the received signal does not correspond to a signal level in the training sequence, performing the step of:
using the accumulated training sequence error value as the accumulated error value.

6. The method of claim 4, wherein an average of the signal levels in the training sequence is zero.

7. The method of claim 4, wherein the step of determining whether a signal level of the received signal corresponds to a signal level in a training sequence comprises determining whether a predetermined amount of time has elapsed since a previous determination that a signal level of the received signal corresponds to a signal level in the training sequence was made.

8. An apparatus comprising:
a comparator that:
associates each of a plurality of expected values with a value range; and determines that a corrected signal falls within the value range of a particular expected value of the plurality of expected values;
a first subtractor that subtracts the particular expected value from the corrected signal to derive an error value;
an accumulator that adds the error value to an accumulated error value;
a limiter which limits the accumulated error value to a particular range that is based on a minimum distance between the plurality of expected values; and
a second subtractor that subtracts the accumulated error value from a received signal to derive the corrected signal;
wherein the received signal is derived from a radio signal.

9. The apparatus of claim 8, wherein the received signal is a baseband signal of the radio signal.

10. The apparatus of claim 8, wherein:
the received signal is an output of a high-pass filter; and
an input of the high-pass filter is a baseband signal of the radio signal.

11. The apparatus of claim 8, further comprising:
a training sequence detector that determines whether a signal level of the received signal corresponds to a signal level in a training sequence;
wherein the training sequence is a predetermined sequence of signal levels.

12. The apparatus of claim 11, further comprising:
a training sequence comparator that subtracts the signal level of the received signal from a corresponding signal level in the training sequence to derive a training sequence error value;
a training sequence error accumulator that adds the training sequence error value to an accumulated training sequence error value;
wherein the second subtractor, in response to the training sequence detector determining that a signal level of the received signal does not correspond to a signal level in a training sequence, subtracts the accumulated training sequence error value to derive the corrected signal.

13. The apparatus of claim 11, wherein an average of the signal levels in the training sequence is zero.

14. The apparatus of claim 11, wherein the training sequence detector determines whether a signal level of the received signal corresponds to a signal level in a training sequence by:
determining whether a predetermined amount of time has elapsed since the training sequence detector previously determined that a signal level of the received signal corresponds to a signal level in the training sequence.

15. The method of claim 1, wherein each value range is unique.

16. The method of claim 15, wherein combining the value ranges associated with the expected values forms a continuous value range.

17. The apparatus of claim 8, wherein each value range is unique.

18. The apparatus of claim 17, wherein combining the value ranges associated with the expected values forms a continuous value range.

* * * * *